United States Patent [19]
Greatbatch

[11] 3,874,929
[45] Apr. 1, 1975

[54] LITHIUM-IODINE BATTERY

[75] Inventor: Wilson Greatbatch, Clarence, N.Y.

[73] Assignee: Wilson Greatback Ltd., Clarence, N.Y.

[22] Filed: Mar. 5, 1973

[21] Appl. No.: 338,101

[52] U.S. Cl............ 136/83 R, 136/100 R, 136/137
[51] Int. Cl. .......................................... H01m 17/02
[58] Field of Search........... 136/6 F, 6 L, 6 LF, 6 A, 136/6 R, 83 R, 100 M, 100 R, 137, 153, 20, 107

[56] References Cited
UNITED STATES PATENTS

| | | | |
|---|---|---|---|
| 3,660,163 | 5/1972 | Moser.............................. | 136/83 R |
| 3,674,562 | 7/1972 | Schneider et al. ............... | 136/83 R |

*Primary Examiner*—Anthony Skapars
*Attorney, Agent, or Firm*—Christel & Bean

[57] ABSTRACT

A lithium-iodine cell comprising a casing of electrically conducting material, an anode including a lithium element within the casing, an electrical conductor operatively connected to the lithium member and extending out from the casing, and a cathode comprising iodine-containing material in contact with both the casing and the lithium member. The anode electrical conductor is completely sealed from the rest of the cell, and the casing serves as the cathode current collector. The anode conductor is positioned in a ferrule which is sealed at the end adjacent the anode with material which is non-reactive with iodine and which is provided with an hermetic seal at the other end.

15 Claims, 4 Drawing Figures

PATENTED APR 1 1975　　3,874,929

3,874,929

LITHIUM-IODINE BATTERY

BACKGROUND OF THE INVENTION

This invention relates to the conversion of chemical energy to electrical energy, and more particularly to a new and improved construction for lithium-iodine cells.

One area of use of the present invention is in providing electrical power safely to inaccessible devices in the human environment, for example to an implanted cardiac pacemaker, although the principles of the present invention can be variously applied. Various batteries for implantable cardiac pacemakers have been proposed but heretofore all have certain limitations. Recently a lithium-iodine cell has been proposed which advantageously has an open circuit voltage about twice that of the mercury cell, does not generate gas during operation, and has a non-corrosive electrolyte.

One of the principal problems in designing a lithium-iodine cell is to prevent iodine leakage. Iodine is present in vapor form and in a complex material which can be viscous or flowable. If the iodine migrates or flows within the cell and makes electrical contact with the anode current collector an internal electrical short circuit is formed in the cell. if the iodine migrates or flows to make electrical contact with the cell outer case, the case becomes common to the cathode terminal. A common case cathode is undesirable if it occurs randomly during cell operation. Therefore, lithium-iodine cells heretofore available have included insulation between the cathode material, i.e., the iodine-containing complex material, and the cell outer case or can.

SUMMARY OF THE INVENTION

It is, therefore, an object of this invention to provide a new and improved construction for a lithium-iodine cell.

It is a more particular object of this invention to provide a lithium-iodine cell wherein the anode current collector is completely sealed or shielded from the iodine-containing cathode material, from the cathode current collector, and from the cell outer casing or can.

It is a further object of this invention to provide such a cell requiring no insulation between the iodine-containing cathode material and the cell outer casing or can.

It is a further object of this invention to provide such a cell having a greater volume of cathode material than heretofore possible.

It is a further object of this invention to provide such a cell which has relatively fewer parts and requires relatively less time to assemble.

It is a further object of this invention to provide such a cell which is relatively easy to examine by X-ray inspection methods.

The present invention provides a lithium-iodine cell comprising a casing, anode means including a lithium-member within the casing, electrical conductor means operatively connected to the lithium member and extending out from the casing, and cathode means comprising iodine-containing material within the casing and contacting the lithium member. The anode conductor means is completely sealed from the rest of the cell with the result that the casing can be of electrically conducting material and no insulation is required between the cathode material and casing. The casing can serve as a cathode current collector thereby allowing iodine-containing cathode material to occupy the entire region between the anode and the casing. The anode conductor means is positioned within a ferrule which is sealed at the end adjacent the anode with material which is non-reactive with iodine and which is provided with an hermetic seal at the other end.

The foregoing and additional advantages and characterising features of the present invention will become readily apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENT

Figure 1:
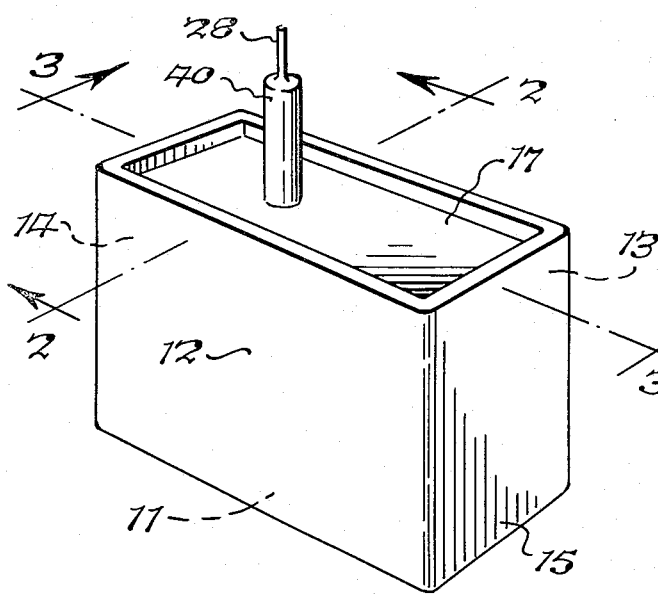
FIG. 1 is a perspective view of a cell according to the present invention.

A lithium-iodine cell according to the present invention comprises a casing of metal such as stainless steel which is preferably shaped or otherwise formed to be hollow rectangular in shape and of an integral construction including a bottom 11, spaced-apart side walls 12, 13 extending from bottom 11 and spaced-apart end walls 14, 15 also extending from bottom 11 and joining corresponding ones of the side walls 12, 13. Casing 10 has an open top but this is sealed closed by means of a lid 17 also of metal such as stainless steel after the cell has been assembled as will be described in detail presently.

The cell of the present invention further includes anode means comprising a pair of lithium members or plates 22, 24 having an anode current collector element 26 sandwiched or positioned therebetween. An electrical conductor 28 is connected to current collector 26 by a weld 30 and is surrounded by a sheath 32 of insulating material such as Teflon, which in addition to being a non-conductor of electricity also is non-reactive with iodine. Of course, other materials having these characteristics can be used for insulation 32. The anode assembly comprising lithium elements 22, 24 and current collector 26 is fitted within an anode holding means or frame 34 which embraces the anode assembly in a manner exposing at least one lithium surface. Frame 34 is of Teflon or any similar material which is non-reactive with iodine. In the present instance, frame 34 surrounds the peripheral edges of lithium members 22, 24 in a snug, sealing relationship. Frame 34 is provided with an aperture of suitable size through which lead 28 and the insulating sheath 32 extend. Frame 34 is of sufficient size and positioned within the casing so that one edge or surface thereof contacts the casing bottom 11, the frame 34 is spaced between the side walls 12, 13, and opposite edges of the frame contact or engage the inner surfaces of casing end walls 14, 15.

The anode can be formed by pressing the lithium members 22, 24 together against current collector 26 with a suitable force, for example about 3,000 pounds, causing the members 22, 24 to be bonded together in a manner sealing current collector 26 therebetween. The resulting assembly then can be fitted in frame 34. Alternatively, lithium members 22, 24 with current collector 26 placed therebetween can be fitted within frame 34 whereupon the entire assembly is pressed together with a force of about the same magnitude. In this instance frame 34 should be of a material which is pressure bondable to lithium. In both instances the current collector 26 is sealed within members 22, 24 and the peripheral juncture at the edges of members 22, 24 is enclosed or sealed by frame 34. If desired, the junction between the inner surface of frame 34 and the periphery of members 22, 24 can be sealed further by a cement which is non-reactive with iodine such as a cyanoacrylate cement commercially available from Techni-Tool Inc. under the designation Permabond 101.

Figure 2:
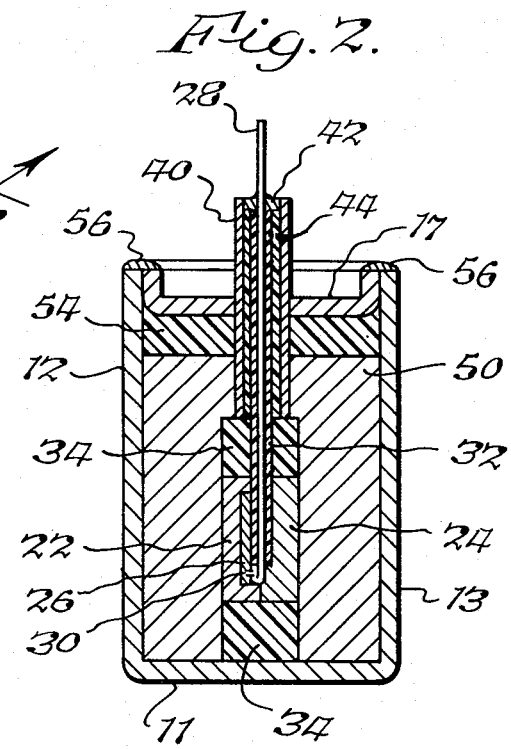
FIG. 2 is a sectional view taken about on line 2—2 in FIG. 1.
Figure 3:
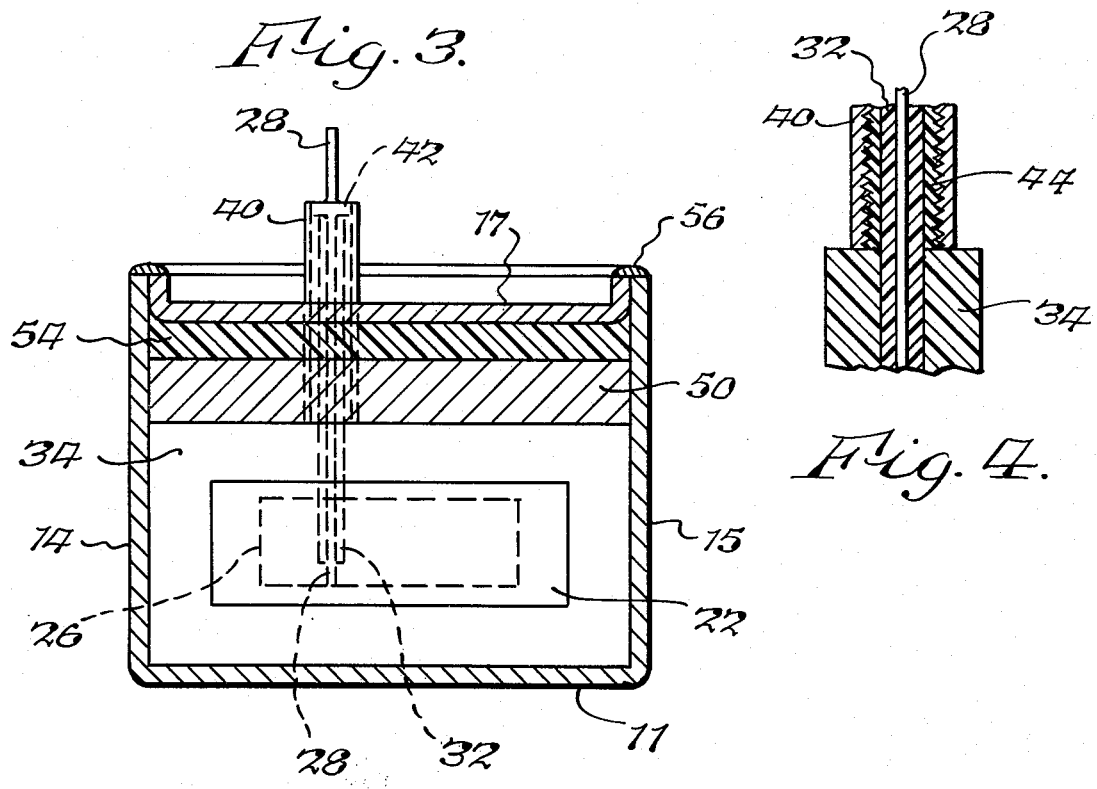
FIG. 3 is a sectional view taken about on line 3—3 in FIG. 1.
Figure 4:
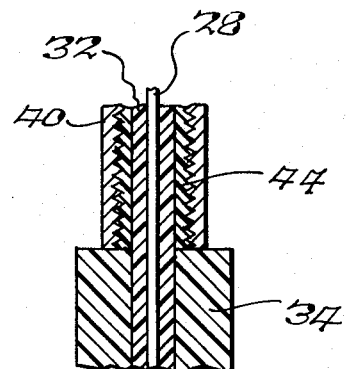
FIG. 4 is an enlarged fragmentary sectional view of an alternative construction of a portion of the cell of FIGS. 1-3.

The cell of the present invention further comprises means for sealing the anode current collector lead or conductor from the cathode of the cell. The sealing means comprises a ferrule 40 preferably of metal such as stainless steel which surrounds or encloses anode current collector lead 28 and insulation 32 in spaced, generally concentric relationship therewith. Ferrule 40 is of a length such that one end thereof is closely adjacent, preferably in contact with, an edge of frame 34 of the anode assembly and the other end of ferrule 40 is located a short distance beyond the opening in the end of casing 10. A seal 42 of glass is welded or formed into the top of ferrule 40 as viewed in FIG. 2 to provide a metal-glass hermetic header, and the bottom void or space in the ferrule is provided with a seal or plug 44 of a material such as Teflon which is non-reactive with iodine. Seal 44 preferably meets or contacts seal 42. In particular, seal 44 can be provided by filling the inner volume of ferrule 40 with Teflon material which then is cured under suitable conditions of heat and pressure. As a result, the seal or plug 44 of Teflon is molded in the ferrule 40 thereby sealing against iodine ingress. Alternatively, seal 44 could be in the form of a preformed plug which threads into the ferrule 40 as shown in FIG. 4 with the result that an even longer leakage path is provided along the threads. Seal 42 alternatively can be of ceramic material, and seal or plug 44 can be of other materials which are non-reactive with iodine.

The cell of the present invention further includes cathode means 50 comprising iodine-containing material within the cell casing. Cathode means 50 preferably comprises a charge transfer complex of an organic material and iodine. The organic material should be an electron donor and can be any organic compound having a double bond or an amine group. An electron donor is necessary to give the iodine sufficient conductivity for propoer cell operation. A preferred organic material is 2-vinyl pyridine polymer. Cathode material or depolarizer 50 is prepared by heating the organic material, i.e., 2-vinyl pyridine, to a temperature greater than the crystallization temperature of iodine and then adding iodine to this heated material. The amount of iodine added preferably will be greater than about 50 percent by weight of the resulting mixture so that enough iodine is available in cathode material 50 to provide sufficient conductivity for proper cell operation. The amount of iodine added, however, should not be so excessive as to interfere with surface contact between the lithium surface of the anode and the cathode material complex 50 by recrystallization.

The resulting mixture is a viscous, flowable substance which can be introduced to the cell casing in the following manner. The casing is held either by hand or in a suitable fixture in an upright position whereupon material 50 is poured into the casing through the open top thereof. Material 50 fills the interior of the casing in an amount sufficient to contact the exposed portion of the lithium members of the anode, and in the present instance material 50 fills the interior of the casing to a level above frame member 34 and near the open top of the casing. The casing is sealed at the top by a sealing layer 54 of epoxy material or the equivalent, whereupon lid member 17 is fitted in the open top of the casing. In particular, lid member 17 is provided with an aperture or opening of sufficient size so that lead 28 and the ferrule 40 around it can extend through and beyond lid 17 whereby an external electrical connection can be made to the anode of the cell. Ferrule 40 is welded to lid 17 and lid 17 in turn is welded at 56 around the peripheral edge thereof to the corresponding edge of the casing.

The lithium-iodine cell according to the present invention operates in the following manner. As soon as iodine-containing cathode material or depolarizer 50 is placed in the casing in contact with the exposed portion of a lithium member of the anode, in the present instance the outer surfaces of lithium elements 22, 24 a lithium iodide electrolyte begins to form at the interface and an electrical potential difference exists between anode lead 28 and the metal casing. It is important that the iodine-containing material 50 is not allowed to come in contact directly with any portion of the electrical conducting means connected to the lithium members of the anode, in particular, anode current collector 26 and lead 28. Otherwise, this will cause an electronic conduction between the cathode material 50 and the anode current collector 26 or lead 28 creating an electrical short circuit condition in the cell. In particular, any migration of the iodine-containing complex of material 50 directly to anode current collector 26 or directly to anode lead 28, instead of first reacting with a lithium member of the anode will result in the condition of electronic conduction thereby creating a short circuit in the cell. On the other hand, when the iodine-containing material 50 contacts only the lithium portion of the anode this gives rise first to a condition of ionic conduction and results in proper cell operation.

The cell construction according to the present invention advantageously prevents an electrical short circuit resulting from migration or flow of iodine-containing material 50. In particular, anode current collector 26 and its connection to lead 28 are sealed within the sandwiched or pressure bonded assembly of lithium plates or members 22, 24. This seal is enhanced by the anode holding means or frame 34 which is of Teflon or similar material which is non-reactive with iodine. If desired, the junction between the inner surface of frame 34 and the peripheral surfaces of lithium members 22, 24 can be sealed further by a suitable cement which is non-reactive with iodine such as the previously mentioned cyanoacrylate cement designated Permabond 101.

The foregoing arrangement together with the provision of ferrule 40 and the seals 42, 44 between ferrule 40 and conductor 28 therein provides an anode structure which is completely sealed with the exception of the exposed lithium surface portions of the anode which are available to the cathode material 50. All parts of anode current collector 26 and electrical lead or conductor 28 connected thereto are shielded from the cathode material, and from the cell casing. Furthermore, the sealed assembly can be completed before the entire cell is assembled, in particular before cathode material 50 is added thereto. The sheath or coating 32 of Teflon or similar insulating material which surrounds lead 28 covers and protects the lead along the entire distance from the glass hermetic seal 42 at the top of ferrule 40 as viewed in FIG. 2 to the weld or connection 30 of lead 28 to anode current collector 26. As a result, the only critical point where iodine from material 50 could contact lead 28 is adjacent the seal 42, and to reach this point the iodine must first traverse the entire inside length of the lower portion of ferrule 40. This portion, however, is sealed or plugged with the Teflon material 44. As previously indicated, the length of the leakage path can be increased by threading seal 44 into ferrule 40.

By having all parts of anode current collector 26 and conductor 28 shielded or sealed from cathode material 50 and from the metal casing, no insulation is needed between the cathode material 50 and the metal casing. The casing can be completely filled with cathode material which more than doubles the iodine content of the cell as compared to cells requiring insulation. Another advantage of the cell of the present invention is that by virtue of the foregoing arrangement, the metal casing becomes a very large cathode current collector thereby improving cell performance due to the relatively larger amount of cathode material in contact with the current collector. By eliminating the need for insulation between cathode material 50 and the metal casing, the cell of the present invention can be assembled relatively quickly and economically and requires fewer parts.

Anode frame or holder 34 fits tightly against a portion of casing bottom 11 and tightly against portions of casing end walls 14, 15. At these surface portions of firm contact, substantially no iodine-containing cathode material 50 is between the metal casing and anode frame 34. Iodine material allows little or no penetration of X-rays. Therefore, X-ray views can be made through these portions of bottom 11 and end walls 14, 15 thereby permitting relatively easy X-ray examination of the interior of a completed and sealed cell.

While a single embodiment of the present invention has been described in detail, this is for the purpose of illustration, not limitation.

I claim:

1. A lithium-iodine cell comprising:
   a. a casing of electrically conducting material;
   b. anode means positioned within said casing and comprising an element of lithium having an exposed surface portion and another surface portion;
   c. electrical conductor means operatively connected to said other surface portion and extending through said casing;
   d. means for sealing said conductor means from the remainder of said cell said sealing means comprising a ferrule surrounding said conductor means in speaced, generally concentric relationship therewith and a seal of a material which is non-reactive with iodine between said ferrule and said conductor means, said ferrule being sealed at one end to said anode means and extending along the portion of said conductor means within said casing;
   e. cathode means comprising iodine-containing material within said casing and in operative contact with said exposed surface portion of said lithium element and with a major portion of the surface of said casing in a manner such that said casing serves as a cathode current collector; and
   f. said sealing means shielding said conductor means from said iodine-containing material and electrically insulating said conductor means from said casing;
   g. whereby an electrical potential difference exists between said conductor means and said casing during operation of said cell.

2. A cell according to claim 1, wherein said electrical conductor means comprises an anode current collector in contact with said other surface portion of said lithium element and an electrical lead connected to said current collector and wherein said sealing means comprises:
   a. means covering the remainder of said current collector which is not in contact with said lithium element; and
   b. means enclosing said electrical lead.

3. A lithium-iodine cell comprising:
   a. a casing of electrically conducting material;
   b. anode means positioned within said casing and comprising an element of lithium having an exposed surface portion and another surface portion;
   c. electrical conductor means operatively connected to said other surface portion and extending from said casing, said conductor means comprising an anode current collector in contact with said other surface portion of said lithium element and an electrical lead connected to said current collector;
   d. means for sealing said conductor means from the remainder of said cell, said sealing means comprising means covering the remainder of said current collector which is not in contact with said lithium element and means enclosing said electrical lead, said enclosing means comprising a ferrule surrounding said lead, said ferrule having one end adjacent said anode current collector, said ferrule having sufficient length so as to extend along the portion of said lead within said casing, a seal between said ferrule and said lead at said end of said ferrule adjacent said current collector, said seal being of a material which is non-reactive with iodine, and an hermetic seal between said ferrule and said lead at the other end of said ferrule; and
   e. cathode means comprising iodine-containing material within said casing and in operative contact with said exposed surface portion of said lithium element and with said casing;
   f. whereby an electrical potential difference exists between said conductor means and said casing during operation of said cell.

4. A cell according to claim 3, wherein said first-named seal extends along the inside of said ferrule and meets said hermetic seal.

5. A cell according to claim 3, wherein said first-named seal is molded in said ferrule.

6. A cell according to claim 3, wherein said first-named seal comprises a plug threaded into said ferrule.

7. A lithium-iodine cell comprising:
   a. a casing of electrically conducting material;

b. anode means positioned within said casing and comprising a pair of lithium elements each having an exposed surface portion and another surface portion;
c. electrical conductor means operatively connected to said other surface portion of each of said lithium elements and extending from said casing, said conductor means comprising an anode current collector and an electrical lead connected to said current collector, said lithium elements being bonded together and against said current collector in a manner sealing said current collector between said elements;
d. means for sealing said conductor means from the remainder of said cell; and
e. cathode means comprising iodine-containing material within said casing and in operative contact with said exposed surface portion of said lithium element and with said casing;
f. whereby an electrical potential difference exists between said conductor means and said casing during operation of said cell.

8. A cell according to claim 7, wherein said anode means further comprises a frame member continuously surrounding the peripheral edges of said lithium members in a manner sealing said edges, said electrical lead extending through said frame member.

9. A cell according to claim 7, wherein said sealing means comprises means enclosing said electrical lead.

10. A cell according to claim 8, wherein said sealing means comprises:
a. a ferrule surrounding said lead, said ferrule having one end in sealing engagement with said frame, said ferrule having sufficient length so as to extend along the portion of said lead within said casing;
b. a seal between said ferrule and said lead at said end of said ferrule adjacent said current collector, said seal being of a material which is non-reactive with iodine; and
c. an hermetic seal between said ferrule and said lead at the other end of said ferrule.

11. A cell according to claim 10, wherein said first-named seal extends along the inside of said ferrule and meets said hermetic seal.

12. A cell according to claim 10, wherein said first-named seal is molded in said ferrule.

13. A cell according to claim 10, wherein said first-named seal comprises a plug threaded into said ferrule.

14. In a lithium-iodine cell including a casing and iodinecontaining cathode material in said casing: a lithium anode element in said casing and having a surface contacting said cathode material; and a frame member embracing said lithium element and having at least one surface portion thereof in firm contact with a portion of the inner surface of said casing so that substantially no iodine-containing cathode material is between the contacting surface portions of said frame member and said casing.

15. Apparatus according to claim 14, wherein said casing is hollow rectangular in shape and said frame has a rectangular peripheral shape and wherein three peripheral surface portions of said frame are in contact with three inner surfaces of said casing.

* * * * *